United States Patent [19]
Dalton

[11] Patent Number: 5,464,226
[45] Date of Patent: Nov. 7, 1995

[54] RETRACTABLE PACKING RINGS FOR STEAM TURBINES

[75] Inventor: William S. Dalton, Chesterfield, Mass.

[73] Assignee: Demag Delaval Turbomachinery Corp. TurboCare Division, Chicopee, Mass.

[21] Appl. No.: 162,278

[22] Filed: Dec. 6, 1993

[51] Int. Cl.⁶ ........................................ F16J 15/48
[52] U.S. Cl. ............................... 277/53; 277/56
[58] Field of Search ........................ 277/53, 54, 55, 277/56, 57, 174; 415/230, 231

[56] References Cited

U.S. PATENT DOCUMENTS

| | | | |
|---|---|---|---|
| 1,689,735 | 10/1928 | Losel | 277/56 |
| 3,155,395 | 11/1964 | Hoffman | 277/53 |
| 3,408,048 | 10/1968 | Scalzo | 253/78 |
| 3,503,616 | 3/1970 | Hickey | 277/53 |
| 3,529,904 | 9/1970 | Scalzo et al. | 415/136 |
| 4,017,088 | 4/1977 | Lerjen | 277/53 |
| 4,466,620 | 8/1984 | Orlowski | 277/53 |
| 5,002,288 | 3/1991 | Morrison et al. | 277/27 |

Primary Examiner—Daniel G. DePumpo
Attorney, Agent, or Firm—Ross, Ross & Flavin

[57] ABSTRACT

In a steam turbine having retractable, spring-loaded, segmented, arcuate packaging rings and holders suspended in the turbine casing and circumscribing the turbine rotor, the packing rings and holders being interengaged by a hook fit and the packing rings being movable by steam pressure between opened and closed position relative to the holders and the rotor, the improvement which comprises providing each of the packing rings and holders with identical mating, curved profiles for providing full contact between the packing rings and holders in the opened position of the packing rings.

4 Claims, 4 Drawing Sheets

RETRACTABLE PACKING RINGS FOR STEAM TURBINES

BACKGROUND OF THE INVENTION

1. Field of the Invention

The invention is directed to segmented retractable packing rings for use with a rotating shaft of a steam turbine.

2. Description of the Prior Art

Reductions in steam turbine efficiency and performance are caused by many factors, among which is steam leakage through the packing rings.

The typical packing ring is formed into arcuate toothed segments held by a hook fit in diaphragm or holder segments so as to circumscribe the shaft and to be movable toward and away therefrom by spring action and/or steam pressure.

The springs hold the segments in minimum clearance position. There is, on average, 0.025" of clearance between the rotating shaft of the turbine and the packing rings. Most turbine manufacturers design packing rings with the springs forcing the packing ring segments toward the shaft to a close clearance position.

The packing is designed so that as steam flows past each tooth, there is a pressure drop. This pressure drop is relatively linear in nature and operates as an opening force.

As closing forces, upstream steam pressure and the spring force act on the back side of the packing ring and downstream pressure past the steam joint face acts on the back side of the packing ring.

The forces, acting in the closing direction, will always be greater than those in the opening direction.

The springs hold the segments against the hook fit, creating a close clearance between the packing segment and the rotating shaft. As steam pressure builds up on the upstream side of the packing it causes the packing segment to move downstream against the hook fit shoulder, forming a sealing surface. The force holding the packing ring radially toward the shaft is a combination of the spring force and the force of the steam leaking into the area on the backside of the packing ring. As the steam flow increases, the ability of the spring to allow the packing segment to move away from the shaft is significantly reduced. High flows eliminate radial movement of the packing segment, due to the steam force and the coefficient of friction that exists between the packing and the holder at the steam seal face. Under this condition, the shaft packing becomes essentially rigid.

With the packing rings of the prior art, the inner or tooling diameter or profile of the packing ring segments does not match the inner or tooling diameter or profile of the diaphragm or holder for the ring segment, the diameters or profiles differing by as much as ¼ inch, so that objectionable rocking of the ring in thee holder occurs in the retracted or opened position.

Thus, the steam in the turbine does not act uniformly on the front and back of the packing, wherefore the packing does not close in a uniform manner.

In addition, this makes it virtually impossible to accurately calculate the forces required for closing the packing, wherefore it is impossible to determine the exact time of closure.

SUMMARY OF THE INVENTION

In the retractable packing of the invention, the hook fit area of the packing is machined to match exactly the mating hook fit of the diaphragm or holder. As previously indicated, a close match at the hook fit area is necessary to maintain the correct radial clearance between the teeth of the packing ring and the turbine rotor.

The invention is concerned with the tooling diameter or profile of the packing ring and the holder.

Herein, the tooling diameter or profile of the packing matches the tooling diameter or profile of the diaphragm or holder.

By matching the tooling diameter or profile of the packing to the tooling diameter or profile of the holder, when the packing is in the retracted, or opened position, the steam is forced to act uniformly on the front and back of the packing, therefore causing the packing to close in a uniform manner.

Thus, the forces required for closing the packing can be more accurately calculated, wherefore the exact time of closure can be determined, which is critical.

DESCRIPTION OF THE PREFERRED EMBODIMENT

Figures 1, 2:
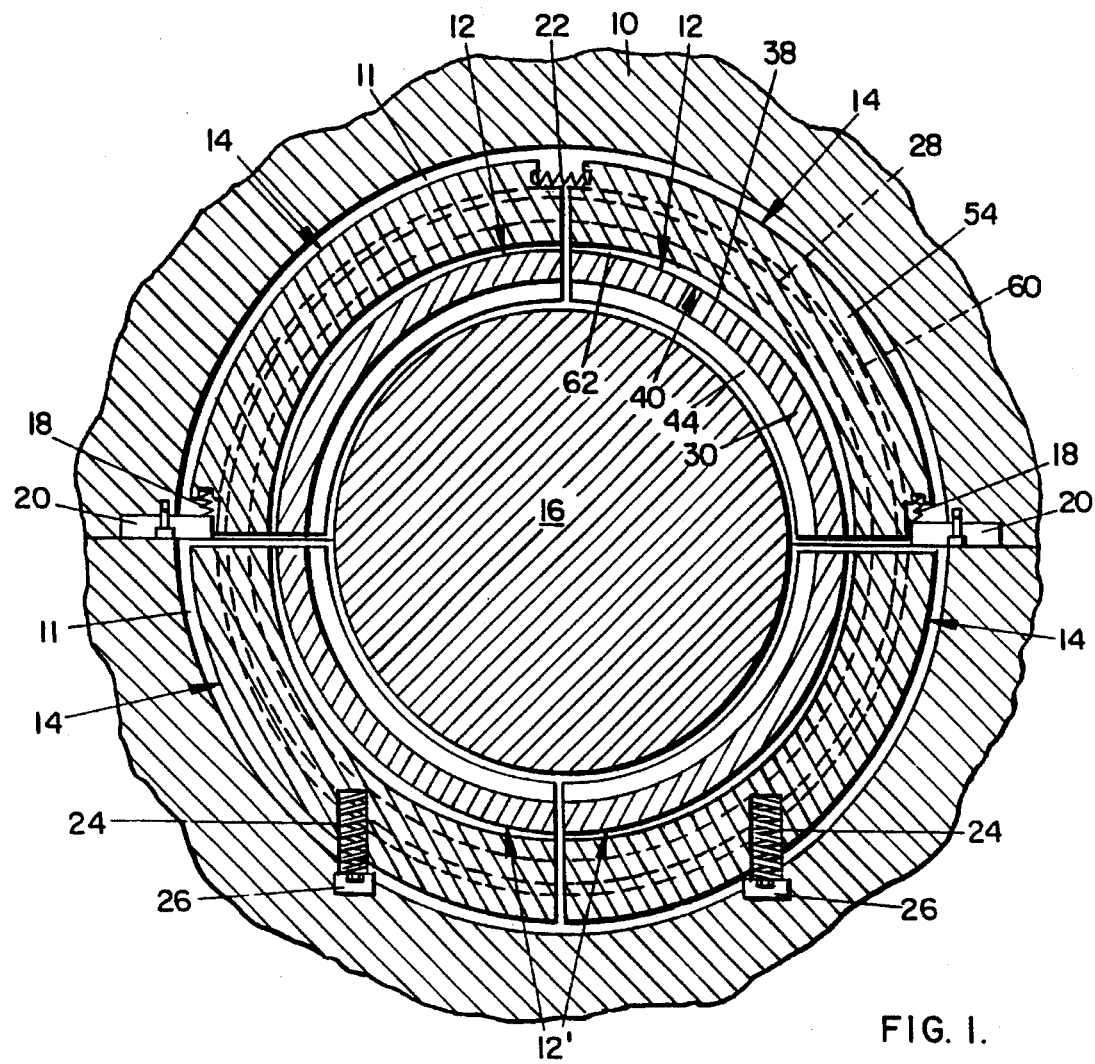
FIG. 1 is a transverse, cross sectional view of a steam turbine employing retractable, segmented packing rings embodying the invention.
FIG. 2 is a fragmentary end perspective view of one of the packing ring segments of FIG. 1.

FIG. 1 is a transverse, cross-sectional view of a turbine casing 10 having a circular bore 11 and a circular rotor 16 centered in the bore and extending longitudinally therethrough.

Disposed within bore 11 are two arcuate upper packing ring segments 12, two arcuate lower packing ring segments 12' and four arcuate packing ring holders 14 which hold the packing ring segments and together form a complete circle and circumscribe turbine rotor 16.

Upper packing ring holders 14 are resiliently supported at their lower ends within turbine casing 10 by vertically-disposed springs 18 which extend upwardly from spaced support keys 20 fixed to turbine casing 10 at its horizontal axis.

A horizontally disposed spring 22 extends between the adjacent upper ends of upper packing ring holders 14 to hold the ring segments in retracted position, as will appear.

Lower packing ring holders 14 are supported within turbine casing 10 by upright coil springs 24 which are fixed at their lower ends to turbine casing 10 and extend into provided openings 26 at the approximate midsection of each packing ring holder 14.

Coil springs 24 offset the weight of packing ring segments 12' and facilitate closure.

This arrangement of packing ring segments and holders provides retractable packing which can close relative to turbine rotor 16 with a minimum pressure drop.

One of upper packing ring segments 12 is shown in FIG. 2 and includes spaced, parallel, horizontally-disposed upper and lower portions 28 and 30 respectively, interconnected by a vertically-disposed centrally-located neck 32.

Upper portion 28 and neck 32 are T-shaped in elevation, while lower portion 30 and neck 32 define an inverted T-shape in elevation.

A hook fit space 40 on each side of neck 32 is defined by spaced, parallel, upright outer side walls 34 of the neck, and spaced, parallel, horizontally-disposed lower walls 36 of upper portion 28 and upper walls 38 of lower portion 30 respectively.

A lower wall 42 of lower portion 30 of packing ring segment 12 has a plurality of transversely spaced, parallel, longitudinally-extending stepped teeth 44 depending therefrom, for purposes to appear.

Figure 3:
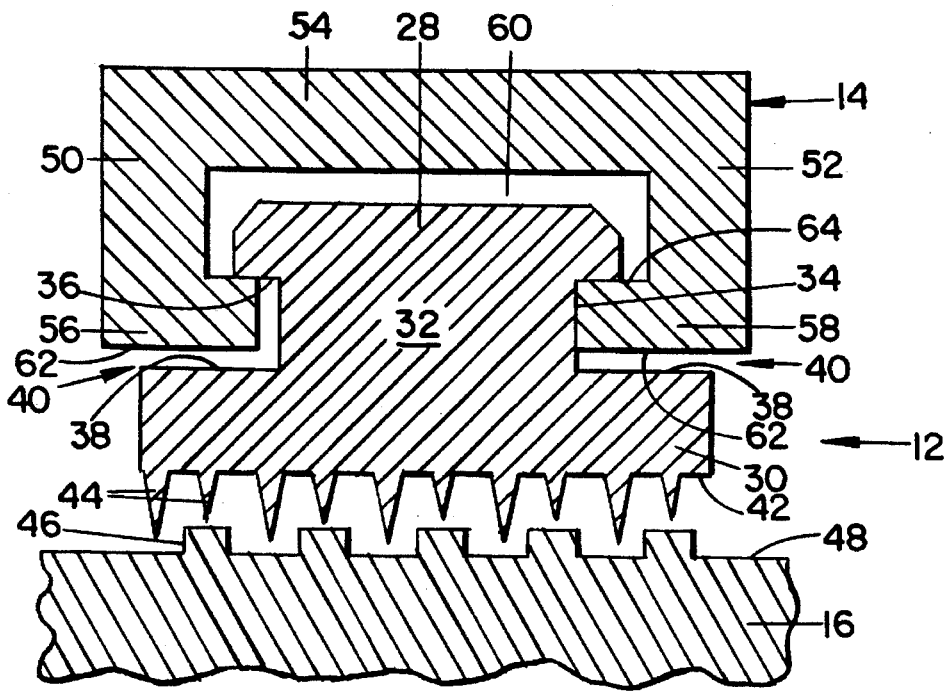
FIG. 3 is a cross sectional view of the packing ring segment of FIG. 2 in association with a diaphragm or packing ring holder and a turbine rotor, the components being shown in a closed or operating position.
Figure 4:
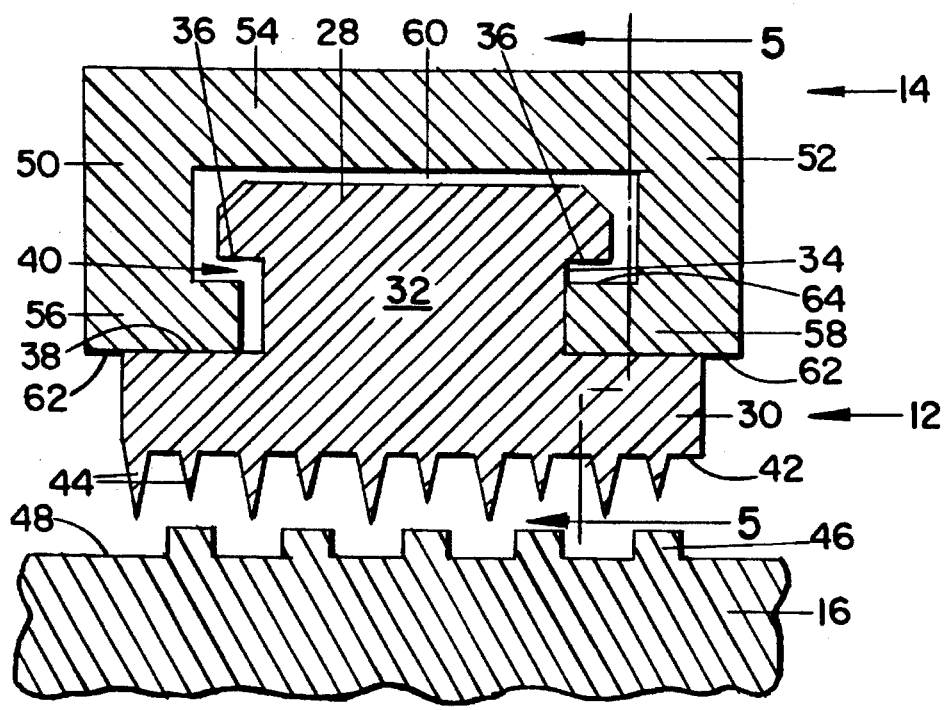
FIG. 4 is a cross sectional view, similar to FIG. 3, the components being shown in an opened or non-operating position.

FIGS. 3 and 4 are cross sectional views showing the relationship of packing ring segments 12 or 12' to packing ring holders 14 and turbine rotor 16, with stepped teeth 44 of the packing ring segments being disposed in opposition to transversely spaced, parallel, longitudinally-extending, circumferential steps 46 and lands 48 respectively of rotor 16 which are alternately stepped up and down in radius.

Packing ring holders 14 are substantially C-shaped in elevation and include spaced parallel upright side walls 50 and 52 interconnected at their upper ends by a horizontally-disposed upper wall 54 and having aligned horizontally-extending fingers 56 and 58 disposed in spaced parallelism to upper wall 54 and extending inwardly from their lower ends, the upper wall, side walls and fingers defining a T-shaped groove 60 which opens into the interior of holder 14 from a lower face 62 of the holder and extends the length of the holder at its approximate midsection.

Upper portion 28 and neck 32 of packing ring segments 12 and 12' are disposed in T-groove 60 of packing ring holders 14 with fingers 56 and 58 of the packing ring holder extending inwardly into hook fit area 40 of the packing ring segment.

The inner end of finger 58 of the holder sealingly engages one of the outer walls 34 of neck 32 of the packing ring in both the closed and opened positions of FIGS. 3 and 4.

In the closed position of FIG. 3, an upper face 64 of fingers 56 and 58 of holder 14 sealingly engages lower walls 36 of upper portion 28 of the sealing ring.

Upper face 64 of fingers 56 and 58 of holder 14 is spaced downwardly from walls 36 of the sealing ring in the opened position of FIG. 4.

In the closed position of FIG. 3, lower faces 62 of fingers 56 and 58 of holder 14 are spaced above upper walls 38 of lower portion 30 of packing ring segments 12 or 12'.

Figure 5:
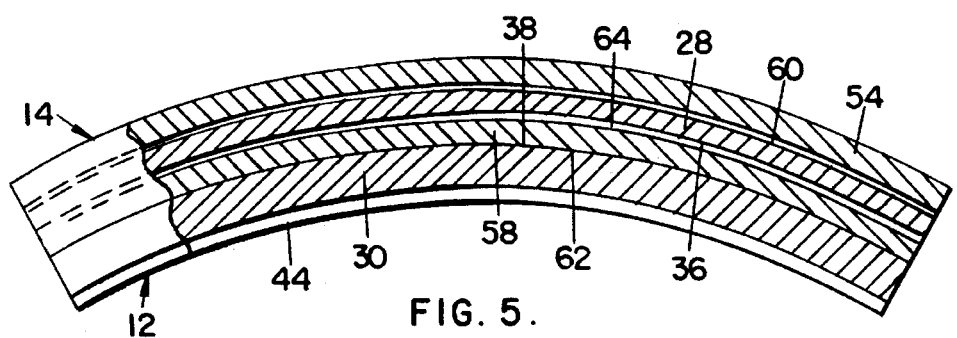
FIG. 5 is a cross-sectional view taken on line 5—5 of FIG. 4 and illustrating the full contact between the packing ring segment and holder.

For optimum turbine effectiveness, and as illustrated in FIGS. 4 and 5, the concave lower faces 62 of fingers 56 and 58 of holder 14 are in full sealing contact with the convex upper walls 38 of lower portion 30 of packing ring segments 12 or 12' for the entire length of the packing ring segment and its holder.

This is accomplished in the structure of the invention by precisely machining the concave curvature or tooling diameter, or profile of the lower faces 62 of fingers 56 and 58 of the holder to match the convex curvature or tooling diameter, or profile of upper walls 38 of lower portion 30 of packing ring segments 12 or 12'.

Figure 6:
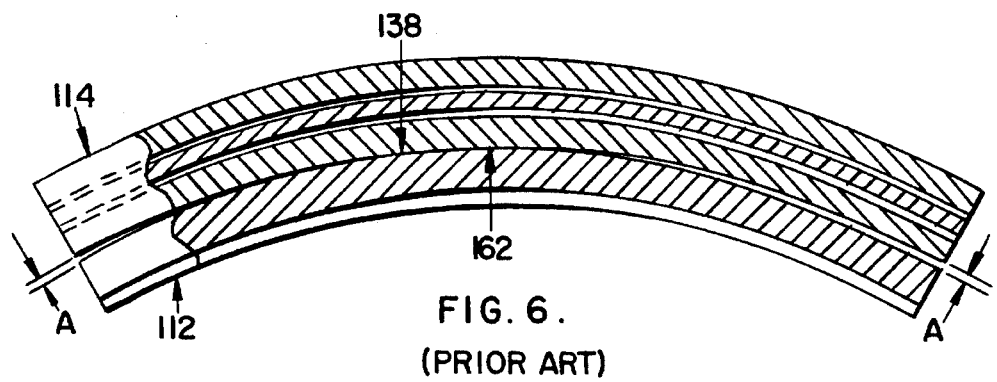
FIG. 6 is a cross-sectional view similar to FIG. 5 of a packing ring segment and holder of the prior art in an opened position and illustrating the limited contact between the packing ring segment and holder.

In prior art structures, these curvatures or tooling diameters, or profiles vary by as much as ¼". This difference in curvatures or diameters or profiles causes the packing to rock in the holder when in the retractable, or opened, position, and is illustrated in FIG. 6, wherein a convex face 138 of a prior art arcuate packing ring segment 112 and a concave face 162 of a prior art arcuate holder 114 meet only in a small area at the approximate midsections of both, leaving a space A at both ends of the packing ring where the faces of the packing ring and holder do not meet, permitting the packing ring segment to rock relative to the holder.

Figure 7:
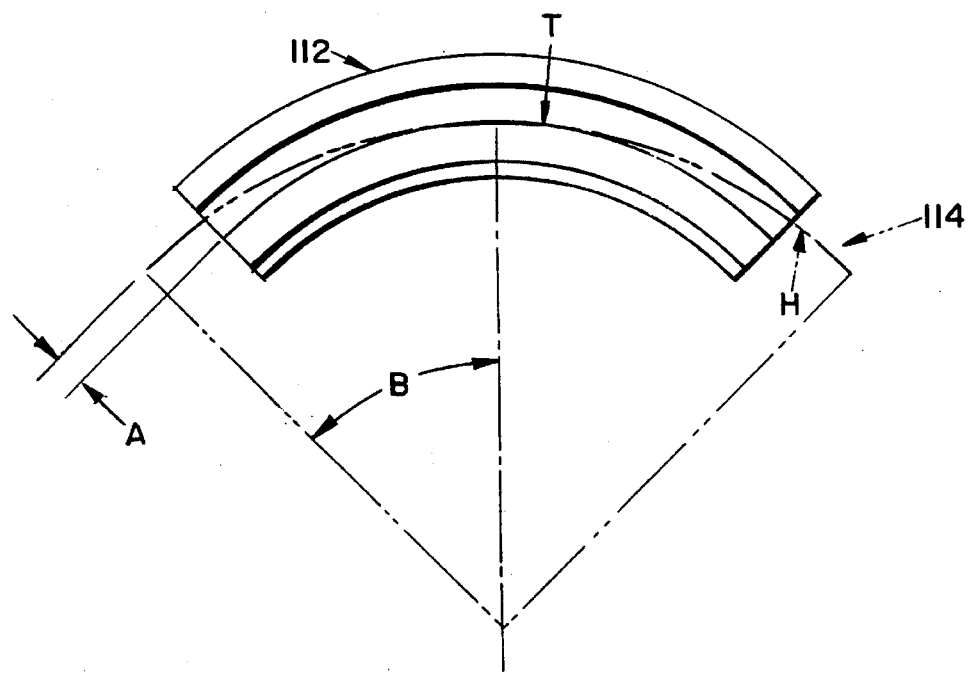
FIG. 7 is a schematic side elevational view of a packing ring segment of the prior art illustrating possible rocking motion.

This rocking motion of the prior art ring segments relative to their holders is shown schematically in FIG. 7, wherein the radius or profile of prior art packing ring segment 112 is designated T and the radius or profile of its holder 114 is designated H and shown in phantom.

Using the following formula:

TRAVEL=H−T

A=TRAVEL−TRAVEL*(COS(B))

The difference in drop of the holder radius and the packing ring radius will be a constant value for any radius providing the angle B and the travel (H-T) are constants. The rocking motion of a segment can be as much as A×2.

If the angle B changes, the distance A of the rocking motion also changes.

Figure 8:
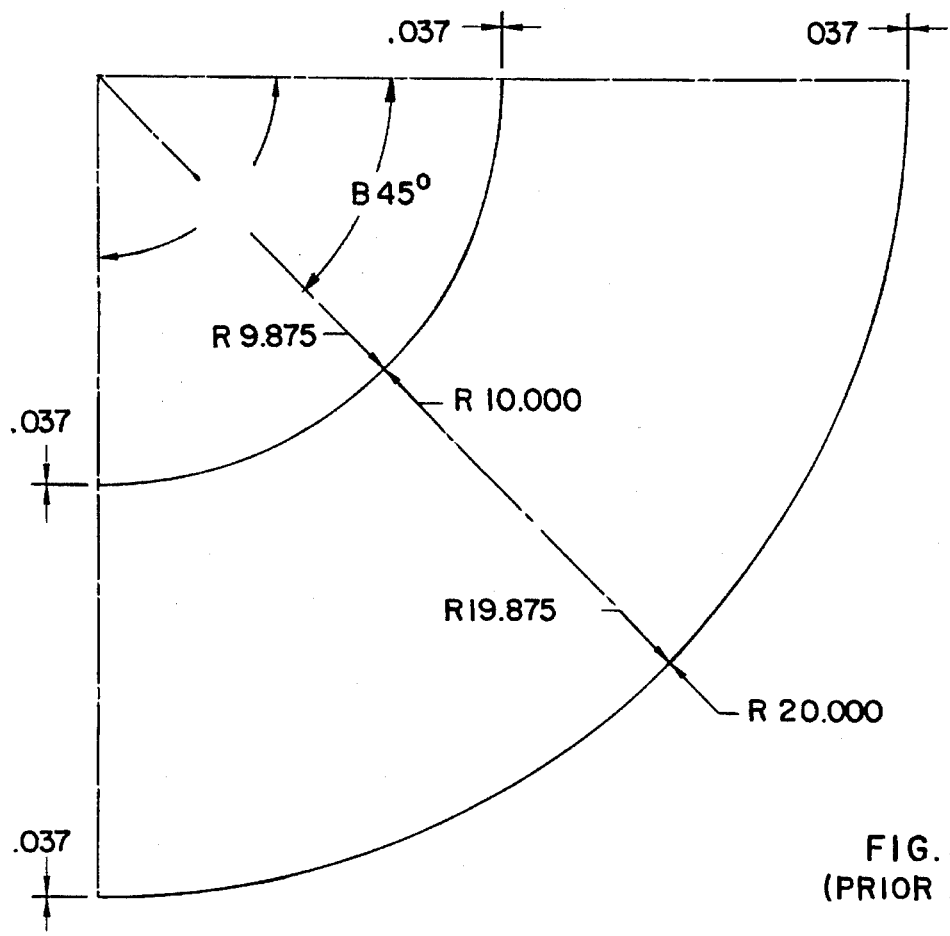
FIG. 8 is a schematic view showing the relationship between angularity, distance, radial contact and possible rocking motion of a prior art packing ring segment if the segment is a 90° included angle with a 10 inch radius or 20 inch radius.
Figure 9:
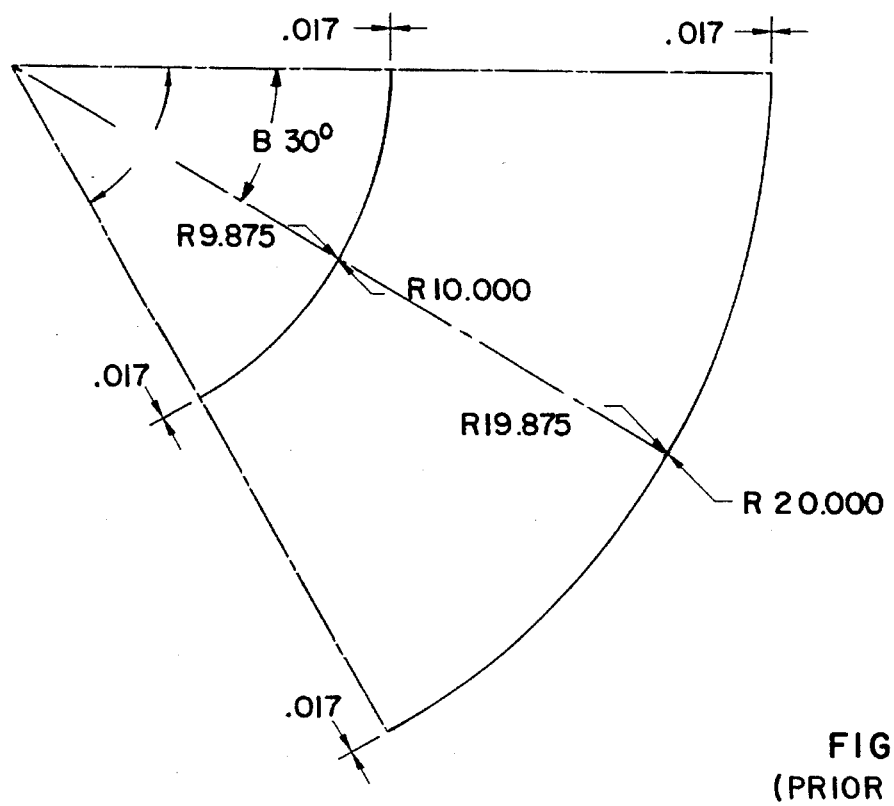
FIG. 9 is a schematic view showing the relationship between angularity, distance, radial contact and possible rocking motion of a prior art packing ring segment if the segment is a 60° included angle with a 10 inch radius or a 20 inch radius.

The rocking motion is further shown schematically in FIGS. 8 and 9, which illustrate that the rocking motion is not affected by differences in radii but does change if the angle B changes.

In FIG. 8, using the following formula:

TRAVEL=20.000−19.875

TRAVEL=0.125

B=45°

A=0.125−0.125×COS(45°)

A=0.037.

This shows a rocking distance of 0.037 at an angle of 45° for the radii 9.875 and 10.000 or the radii 19.875 and 20,000.

In FIG. 9, using the following formula:

TRAVEL=10,000−9.875

TRAVEL - 0.125

B=30°

A=0.125−0.125×COS(30°)

A=0.017

This shows a rocking distance of 0.017 at an angle of 30° for the radii 9.875 and 10.000 or the radii 19.875 and 20,000.

I claim:

1. In a steam turbine having retractable, spring-loaded, segmented, arcuate, packing rings and holders suspended in the turbine casing and circumscribing the turbine rotor, the packing rings and holders being interengaged by a hook fit and the packing rings being movable by steam pressure between opened and closed position relative to the holders and the rotor, the improvement which comprises providing each of the packing rings and holders with identical, mating, curved profiles for providing full contact between the packing rings and holders in the opened position of the packing rings.

2. In a steam turbine according to claim 1, wherein the curved profiles of the packing rings are convex and wherein the curved profiles of the holders are concave.

3. In a steam turbine according to claim 1, wherein the holders are C-shaped in cross section and include a T-shaped groove which opens into its interior from a lower face of the holder and extends the length of the holder at its approximate midsection and defines a pair of aligned fingers, and wherein the packing rings are T-shaped in elevation and define a hook fit space for engagement by the fingers of the holders.

4. In a steam turbine according to claim 3, wherein the hook fit of the packing rings and the fingers of the holders are provided with identical, mating, curved profiles.

* * * * *